US008392067B2

(12) United States Patent
Yamamoto et al.

(10) Patent No.: US 8,392,067 B2
(45) Date of Patent: Mar. 5, 2013

(54) POWER STEERING DEVICE (75) Inventors: Satoru Yamamoto, Settsu (JP); Takaaki Noda, Settsu (JP); Yasuto Yanagida, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 378 days.

(21) Appl. No.: 12/935,211

(22) PCT Filed: Mar. 11, 2009

(86) PCT No.: PCT/JP2009/054670
§ 371 (c)(1),
(2), (4) Date: Sep. 28, 2010

(87) PCT Pub. No.: WO2009/122877
PCT Pub. Date: Oct. 8, 2009

(65) Prior Publication Data
US 2011/0046852 A1    Feb. 24, 2011

(30) Foreign Application Priority Data

Mar. 31, 2008 (JP) .................................. 2008-090426

(51) Int. Cl.
*A01B 69/00* (2006.01)
(52) U.S. Cl. .......................................................... 701/41
(58) Field of Classification Search ...................... 701/41
See application file for complete search history.

(56) References Cited

U.S. PATENT DOCUMENTS

| 5,259,413 A | 11/1993 | Harpole et al. |
| 5,971,093 A | 10/1999 | Arita et al. |
| 6,082,242 A | 7/2000 | Suzuki |
| 6,230,839 B1 | 5/2001 | Elser et al. |
| 2007/0080015 A1 | 4/2007 | Szabela et al. |

FOREIGN PATENT DOCUMENTS

| DE | 195 42 636 A1 | 5/1996 |
| JP | 63-145173 A | 6/1988 |
| JP | 6-179371 A | 6/1994 |
| JP | 8-142889 A | 6/1996 |
| JP | 9-249142 A | 9/1997 |

(Continued)

OTHER PUBLICATIONS

European Search Report of corresponding EP Application No. 09 72 7901.2 dated Sep. 6, 2012.

(Continued)

*Primary Examiner* — Thomas Tarcza
*Assistant Examiner* — Maceeh Anwari
(74) *Attorney, Agent, or Firm* — Global IP Counselors (57) ABSTRACT

A power steering device includes an oil-hydraulic pump, an electric motor to drive the pump, an inverter, a control valve, a power cylinder to produce a steering assist, and a control unit to control the drive signal of the inverter. The control valve includes a pump port supplied with oil from the pump, a first and second cylinder ports connected to first and second cylinder chambers on sides of the piston, and a discharge port. Communication between the first cylinder port and the pump port and communication between the second cylinder port and the discharge port, and communication between the first cylinder port and the discharge port and communication between the second cylinder port and the pump port are established in steered status in the other direction. Communication among the pump port and first and second cylinder ports, and isolation of the discharge port from the pump port and first and second cylinder ports are established when the control valve is in neutral status.

10 Claims, 7 Drawing Sheets

FOREIGN PATENT DOCUMENTS

| | | |
|---|---|---|
| JP | 2735743 B2 | 9/1998 |
| JP | 2000-1173 A | 1/2000 |
| JP | 2000-255439 A | 9/2000 |
| JP | 2001-199355 A | 7/2001 |
| JP | 2001-524905 A | 12/2001 |
| JP | 2007-531667 A | 11/2007 |
| KR | 10-0151533 B1 | 6/1998 |
| KR | 10-1999-0037147 | 5/1999 |
| KR | 10-2000-0008986 | 2/2000 |
| WO | WO-2005/100131 A2 | 10/2005 |

OTHER PUBLICATIONS

International Search Report of corresponding PCT Application No. PCT/JP2009/054670.

LEFTWARD STEERED STATUS

Fig.3B

NEUTRAL STATUS (STRAIGHT-AHEAD DRIVE)

Fig.3C

RIGHTWARD STEERED STATUS

POWER STEERING DEVICE

CROSS-REFERENCE TO RELATED APPLICATIONS

This U.S. National stage application claims priority under 35 U.S.C. §119(a) to Japanese Patent Application No. 2008-090426, filed in Japan on Mar. 31, 2008, the entire contents of which are hereby incorporated herein by reference.

TECHNICAL FIELD

The present invention relates to a power steering device and particularly to a power steering device that produces a steering assist force with use of an electric motor and an oil-hydraulic pump when a steering wheel of a vehicle is operated.

BACKGROUND ART

Among conventional power steering devices is one that reduces a steering force for a vehicle with use of an electric motor and an oil-hydraulic pump (see JP 2735743 B, for example).

Figure 7:
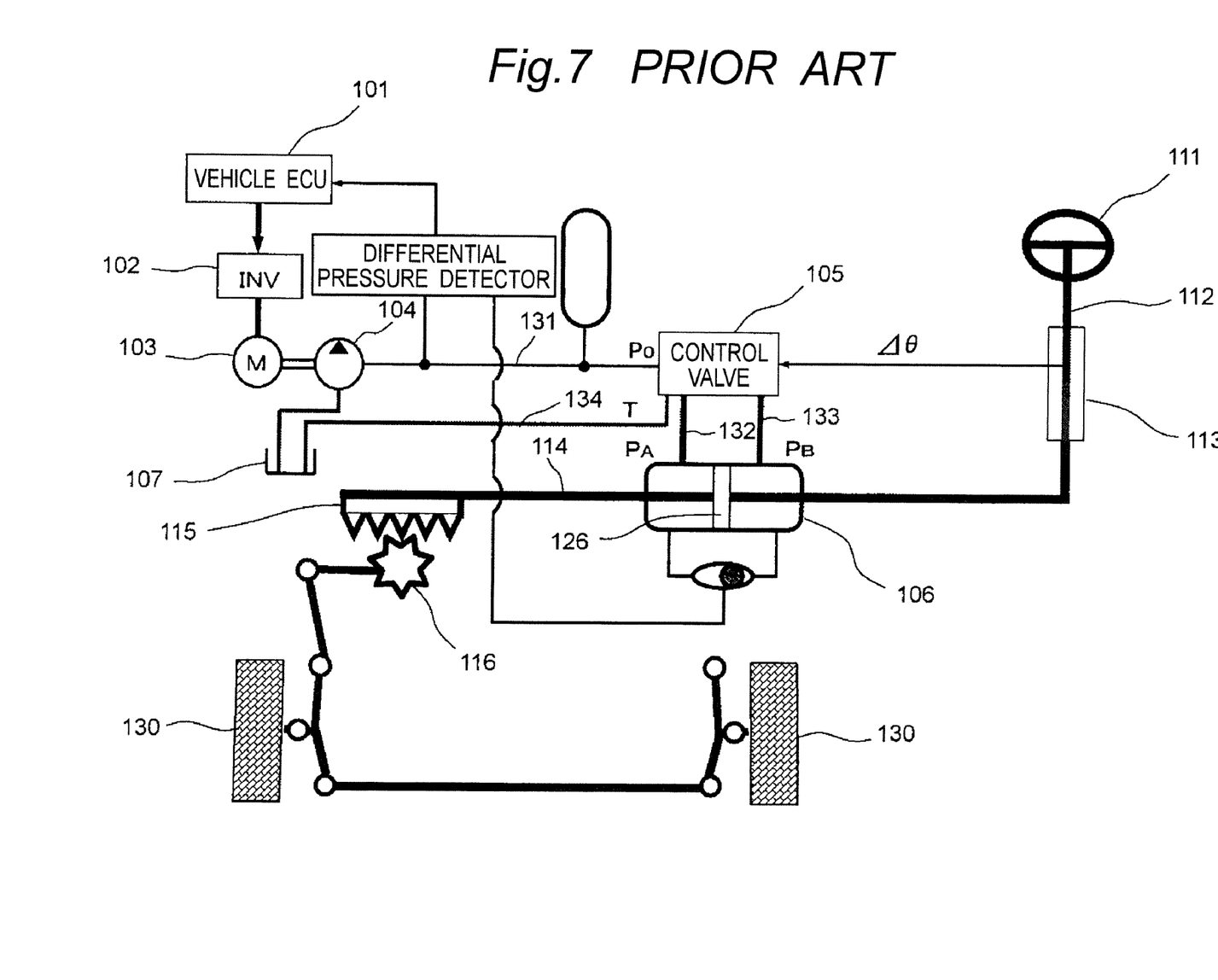
FIG. 7 is a schematic diagram showing a configuration of a conventional power steering device.

In a schematic diagram of FIG. 7 is shown an example of a configuration of a power steering device that uses such an electric motor and such an oil-hydraulic pump. The power steering device has a vehicle ECU (Electronic Control Unit) 101, an inverter 102, a motor 103, an oil-hydraulic pump 104, a control valve 105, a power cylinder 106, and an oil reservoir tank 107. A piston 126 is driven by oil supplied from the oil-hydraulic pump 104 through the control valve 105, so as to produce a steering assist force.

The power steering device has an input shaft 112 having one end connected to a steering wheel 111 and the other end connected to one side of a torsion bar 113, and a worm shaft not shown and having one end connected to the other side of a torsion bar 113. The worm shaft is axially inserted into the piston 126 and is fitted in the piston 126 by a ball thread mechanism not shown. The piston 126 is connected to or formed integrally with an output shaft 114 and is movable in an axial direction of the piston 126. A motion of the steering wheel 111 in a steering direction is transmitted to the control valve 105 through the torsion bar 113, so that the control valve 105 is switched according to the steering direction of the steering wheel 111.

The output shaft 114 of the power steering device has a rack 115, with which a sector gear 116 meshes. Angles of tires 130, 130 on both sides are simultaneously changed by a link mechanism connected to a shaft of the sector gear 116.

The oil-hydraulic pump 104 and the control valve 105 of the power steering device are connected to each other through an oil supply passage 131 communicating with a pump port. One cylinder port of the control valve 105 is connected to one cylinder chamber of the power cylinder 106 through an oil passage 132, and the other cylinder port of the control valve 105 is connected to the other cylinder chamber of the power cylinder 106 through an oil passage 133. A discharge port of the control valve 105 is connected to a tank 107 through an oil passage 134.

The power steering device has a problem that communication between the pump port, both the cylinder ports, and the discharge port in a neutral position allows oil flow and causes additional consumption of electric power by the motor 103 when the assist does not work during straight-ahead driving, stoppage of the car, or the like. The power steering device has another problem that quick turn of wheel in steering passing through the neutral position causes oil from pump port side to flow to tank side and thus causes a steerer to feel a sense of sticking, because the oil is drawn into oil flow returning from the cylinder chamber to tank side on occasion of the passage through the neutral position.

SUMMARY

Technical Problem

Therefore, it is an object of the invention to provide a power steering device that is capable of attaining energy saving by a simple configuration and eliminating a sense of sticking in quick turn of wheel in steering.

Solution to Problem

In order to achieve the object, a power steering device of the invention comprises:
an oil-hydraulic pump,
an electric motor for driving the oil-hydraulic pump,
an inverter for outputting a drive signal to the electric motor,
a control valve for switching passages for oil supplied from the oil-hydraulic pump, a power cylinder for producing a steering assist force by a piston driven by oil supplied from the oil-hydraulic pump through the control valve, and
a control unit for controlling the drive signal of the inverter,
wherein the control valve comprises a pump port that is supplied with oil from the oil-hydraulic pump, a first cylinder port that is connected to a first cylinder chamber on one side of the piston, a second cylinder port that is connected to a second cylinder chamber on the other side of the piston, and a discharge port, wherein
communication between the first cylinder port and the pump port and communication between the second cylinder port and the discharge port are established in steered status in one direction, while communication between the first cylinder port and the discharge port and communication between the second cylinder port and the pump port are established in steered status in the other direction, and wherein
communication among the pump port, the first cylinder port and the second cylinder port and isolation of the discharge port from the pump port and the first and second cylinder ports are established when the control valve is in neutral status.

According to the above configuration, in the steered status in one direction, the communication between the first cylinder port of the control valve and the pump port and the communication between the second cylinder port and the discharge port are established, so that the oil supplied from the oil-hydraulic pump to the pump port is supplied from the first cylinder port to the first cylinder chamber of the power cylinder. Thus the piston of the power cylinder is driven by the oil supplied from the oil-hydraulic pump through the control valve, so as to produce a steering assist force. On this occasion, oil in the second cylinder chamber of the power cylinder is discharged from the discharge port. In the steered status in the other direction, the communication between the first cylinder port of the control valve and the discharge port and the communication between the second cylinder port and the pump port are established, so that the oil supplied from the oil-hydraulic pump to the pump port is supplied from the second cylinder port to the second cylinder chamber of the power cylinder. Thus the piston of the power cylinder is driven in opposite direction by the oil supplied from the oil-hydraulic pump through the control valve, so as to produce a steering assist force. On this occasion, oil in the first cylinder chamber of the power cylinder is discharged from the discharge port.

When a steering wheel is not steered in a neutral position during straight-ahead driving, stoppage of the vehicle, or the like, the control valve comes into neutral status, drive signals of the inverter are controlled by the control unit in the status in which the communication among the pump port, the first cylinder port and the second cylinder port and the isolation of the discharge port from the pump port and the first and second cylinder ports are established, and the oil-hydraulic pump is driven so that status in which the first and second cylinder chambers of the power cylinder are filled with oil is just maintained, for instance. Such an operation makes oil hardly flow in status in which the assist does not work, so as to reduce quantity of wasteful oil flow, so that reduction in power consumption and energy saving can be achieved while heat generation from the electric motor is reduced.

As the communication among the pump port, the first cylinder port and the second cylinder port and the isolation of the discharge port from the pump port and the first and second cylinder ports are established in the neutral status of the control valve in quick turn of wheel in steering, oil in the first and second cylinder chambers is prevented from returning to the tank side through the first and second cylinder ports and the discharge ports on occasion of passage through the neutral position in the quick steering, and thus passage of oil from the pump ports side through the discharge port to the tank side is prevented. This reduces a phenomenon of sticking in a steering wheel operation in quick turn of wheel in steering.

Thus the power steering device can be provided that is capable of attaining energy saving by a simple configuration and eliminating a sense of sticking in quick turn of wheel in steering.

In accordance with one aspect of the present invention, the control unit controls the inverter, when the control valve is in the neutral status, so as to run the electric motor at a lower velocity than in steering operations in order to maintain status in which the first and second cylinder chambers of the power cylinder are filled with oil.

With such a configuration, response in transition of the control valve from the neutral status to steered status can be maintained by low power consumption, provided that the electric motor is run at a lower velocity than in the steering operation by control over the inverter by the control unit, in the neutral status of the control valve, so that the status in which the first, second cylinder chambers of the power cylinder are filled with oil is maintained.

In accordance with another aspect of the present invention, the control valve is a rotary valve.

With such a configuration, the use of the rotary valve as the control valve makes it possible to use rotation of the steering wheel in a steering operation, as it is, for a switching operation of the control valve, eliminates necessity of conversion from a rotating motion to a straight motion, further simplifies the configuration, and results in size reduction.

In accordance with another aspect of the present invention, the rotary valve comprises a sleeve and a cylindrical rotor that is rotatably fitted in the sleeve, wherein
  grooves are provided on outer circumference of the rotor so that communication between specified ports out of the plurality of ports provided on the sleeve is established according to rotation of the rotor, and wherein
  the grooves of the rotor are provided with an inclination with respect to a direction of a generatrix along a plane tangent to an outer circumferential surface of the rotor.

With such a configuration, by the provision of the grooves, inclined with respect to the direction of generatrix along the plane tangent to the outer circumferential surface of the rotor, on the outer circumference of the rotor that is rotatably fitted in the sleeve of the rotary valve, when communication between specified ports out of the plurality of ports provided on the sleeve is established through the grooves with rotation of the rotor, the rotation of the rotor causes gradual increase in areas of opening between the grooves and the ports facing the grooves, and smooth change in the oil pressure in the switching of the rotary valve, so that occurrence of a feeling of wrongness in operation of the steering wheel that might be caused by sudden change in the oil pressure is prevented.

In accordance with another aspect of the present invention, the oil-hydraulic pump (4) is a gear pump.

With such a configuration, the gear pump is used as the oil-hydraulic pump, and thus the oil can be supplied by revolution at an extremely low velocity in order to maintain the status in which the first and second cylinder chambers of the power cylinder are filled with oil when the control valve is in the neutral status, so that power consumption can be reduced. In comparison with vane pumps ordinarily used in power steering devices, the gear pump is more suitable for low-velocity operation in terms of self-priming ability and the like and is more suitable for reduction in size and cost because of a simple structure thereof.

In accordance with another aspect of the present invention, the power steering device further comprises
  an oil pressure sensor for detecting a pressure of oil supplied from the oil-hydraulic pump to the control valve, wherein
  the control unit controls the drive signal of the inverter on basis of the pressure of the oil detected by the oil pressure sensor.

With such a configuration, the drive signals of the inverter are controlled by the control unit, on basis of the oil pressure detected by the oil pressure sensor, and thus oil having a pressure required for a steering assist force can be supplied from the oil-hydraulic pump to the power cylinder.

In accordance with another aspect of the present invention, the control unit controls a frequency of the drive signal of the inverter so that the pressure of the oil detected by the oil pressure sensor reaches a target value corresponding to at least one of signals representing a speed of a vehicle and a signal representing a steering angle.

With such a configuration, the control unit controls the frequency of the drive signal outputted from the inverter so as to adjust the oil pressure detected by the oil pressure sensor to the target value corresponding to at least one of the signals representing the speed of the vehicle and the signal representing the steering angle, and is thereby capable of producing a steering assist force optimal for the speed of the vehicle, the steering angle or the like and improving steering ability. For instance, the steering assist force is weakened in high-speed driving whereas the steering assist force is strengthened in low-speed driving or stopped status, and/or the steering assist force is weakened when the steering angle is small whereas the steering assist force is strengthened when the steering angle is large.

Advantageous Effects of Invention

With a power steering device in accordance with one or more of the above aspects of the invention, as apparent from the above, the power steering device can be provided that is capable of attaining energy saving by a simple configuration and eliminating a sense of sticking in quick turn of wheel in steering.

With a power steering device in accordance with one or more of the above aspects, response in transition of the control valve from the neutral status to steered status can be maintained by low power consumption, provided that the electric motor is run at a lower velocity than in the steering operation by control over the inverter by the control unit, in the neutral status of the control valve, so that the status in which the first, second cylinder chambers of the power cylinder are filled with oil is maintained.

With a power steering device in accordance with one or more of the above aspects, the use of the rotary valve as the control valve makes it possible to use rotation of the steering wheel in a steering operation, as it is, for a switching operation of the control valve, eliminates necessity of conversion from a rotating motion to a straight motion, further simplifies the configuration, and results in size reduction.

With a power steering device in accordance with one or more of the above aspects, by the provision of the grooves, inclined with respect to the direction of generatrix along the plane tangent to the outer circumferential surface of the rotor, on the outer circumference of the rotor that is rotatably fitted in the sleeve of the rotary valve, when communication between specified ports out of the plurality of ports provided on the sleeve is established through the grooves with rotation of the rotor, the rotation of the rotor causes gradual increase in areas of opening between the grooves and the ports facing the grooves, and smooth change in the oil pressure in the switching of the rotary valve, so that occurrence of a feeling of wrongness in operation of the steering wheel that might be caused by sudden change in the oil pressure is prevented.

With a power steering device in accordance with one or more of the above aspects, the gear pump is used as the oil-hydraulic pump, and thus the oil can be supplied by revolution at an extremely low velocity in order to maintain the status in which the first and second cylinder chambers of the power cylinder are filled with oil when the control valve is in the neutral status, so that power consumption can be reduced.

With a power steering device in accordance with one or more of the above aspects, the drive signals of the inverter are controlled by the control unit, on basis of the oil pressure detected by the oil pressure sensor, and thus oil having a pressure required for a steering assist force can be supplied from the oil-hydraulic pump to the power cylinder.

With a power steering device in accordance with one or more of the above aspects, the control unit controls the frequency of the drive signal outputted from the inverter so as to adjust the oil pressure detected by the oil pressure sensor to the target value corresponding to at least one of the signals representing the speed of the vehicle and the signal representing the steering angle, and is thereby capable of producing a steering assist force optimal for the speed of the vehicle, the steering angle or the like and improving steering ability.

DESCRIPTION OF EMBODIMENTS

Hereinbelow, a power steering device of the invention will be described in detail with reference to embodiments shown in the drawings.

Figure 1:
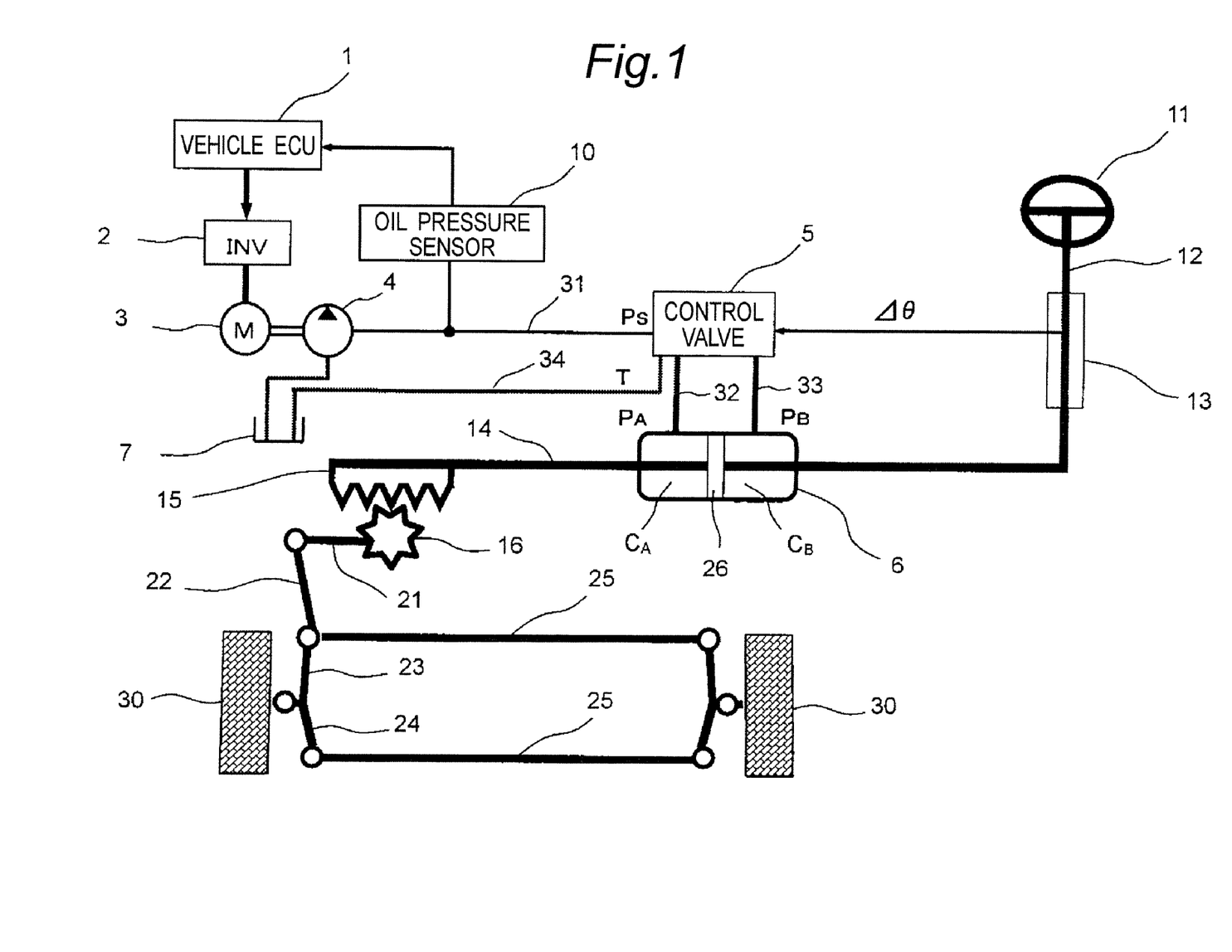
FIG. 1 is a schematic diagram showing a configuration of a power steering device in accordance with an embodiment of the invention.

FIG. 1 is a schematic diagram showing a configuration of the power steering device in accordance with an embodiment of the invention.

As shown in FIG. 1, the power steering device of the embodiment has a vehicle ECU (Electronic Control Unit) as an example of a control unit, an inverter 2 that outputs a drive signal upon reception of a control signal from the vehicle ECU 1, an electric motor 3 that runs on basis of the drive signal from the inverter 2, an oil-hydraulic pump 4 that is driven by the electric motor 3, a control valve 5 in which oil from the oil-hydraulic pump 4 is supplied to pump ports, a power cylinder 6 in which a piston 26 is driven by the oil supplied from the oil-hydraulic pump 4 through the control valve 5 so as to produce a steering assist force, and an oil reservoir tank 7. A gear pump is used as the oil-hydraulic pump 4.

The power steering device has an input shaft 12 having one end connected to a steering wheel 11 and the other end connected to one side of a torsion bar 13, and a worm shaft not shown and having one end connected to the other side of the torsion bar 113. The worm shaft is axially inserted into the piston 26 and is fitted in the piston 26 by a ball thread mechanism not shown. The piston 26 is connected to or formed integrally with an output shaft 14 and is movable in an axial direction of the piston 26. A motion of the steering wheel 11 in a steering direction is transmitted to the control valve 5 through the torsion bar 13, so that the control valve 5 is switched according to the steering direction of the steering wheel 11.

The output shaft 14 of the power steering device has a rack 15 on the other end side thereof, and a sector gear 16 meshes with the rack 15. A pitman arm 21 having one end connected to a shaft of the sector gear 16 swings and cooperates with a drag link 22, a steering knuckle arm 23, a tie rod arm 24, and tie rods 25, so as to simultaneously change angles of tires 30, 30 on both sides.

The vehicle ECU 1 detects a strain of the torsion bar 13 by a strain sensor, for instance, and determines whether the control valve 5 is in leftward or rightward steered status or is in the neutral status on basis of an output signal from the strain sensor. Alternatively, the determination of the steered status or the neutral status is carried out on basis of an output signal from a rudder angle sensor not shown and mounted in the steering wheel unit.

The oil-hydraulic pump 4 and the control valve 5 of the power steering device are connected to each other through an oil supply passage 31 communicating with the pump ports. In the oil supply passage 31 is provided an oil pressure sensor 10 for detecting a pressure of oil in the oil supply passage 31. A first cylinder port of the control valve 5 is connected to a first cylinder chamber CA of a power cylinder 6 through an oil passage 32, and a second cylinder port of the control valve 5 is connected to a second cylinder chamber CB of the power cylinder 6 through an oil passage 33. A discharge port of the control valve 5 is connected to a tank 7 through an oil passage 34.

Figure 2:
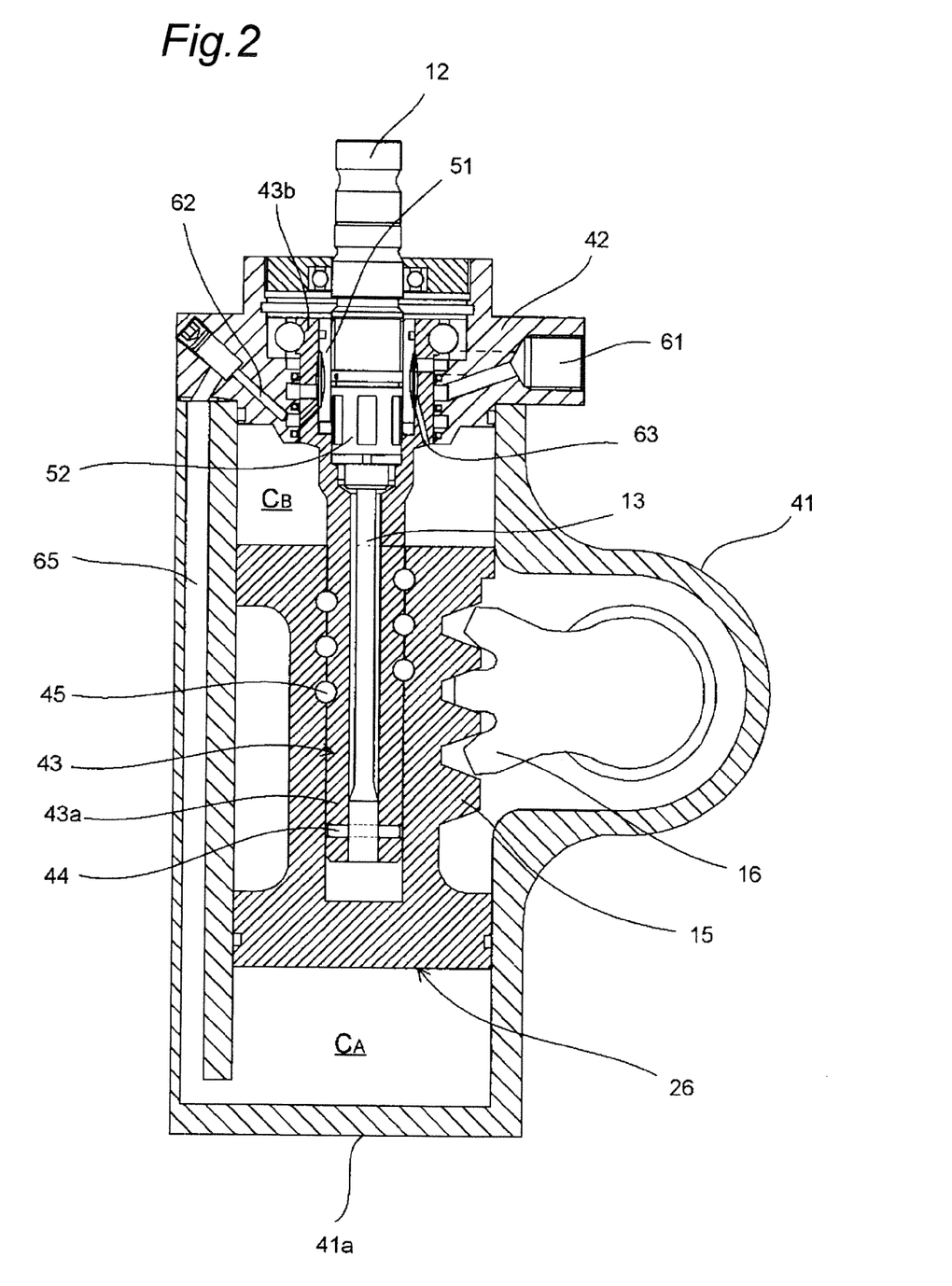
FIG. 2 is a sectional view of a power steering main unit in which a control valve and a power cylinder of the power steering device are integrated.

FIG. 2 shows a sectional view of a power steering main unit in which the control valve 5 and the power cylinder 6 of the power steering device are integrated. In FIG. 2, the same components as those of the power steering device shown in FIG. 1 are designated by the same reference numerals. FIG. 1 schematically shows the configuration of the power steering device, and the piston 26 in the power steering main unit shown in FIG. 2 corresponds to the output shaft 14.

As shown in FIG. 2, the power steering main unit has the piston 26 provided slidably in a cylinder part 41a of a body 41. The piston 26 partitions the inside of the cylinder part 41a into the two cylinder chambers, i.e., the first and second cylinder chambers CA, CB. The sector gear 16 meshes with the rack 15 formed on one side face of the piston 26.

A small diameter part 43a of the worm shaft 43 is screwed in a hole formed in a shaft part of the piston 26 through medium of a plurality of balls 45. A large diameter part 43b of the worm shaft 43 is rotatably supported by a valve housing 42 fixed to the body 41. With the rotation of the worm shaft 43, the piston 26 axially slides in the cylinder part 41a.

A sleeve 51 is formed integrally with the large diameter part 43b of the worm shaft 43. A rotor 52 having one end connected to the input shaft 12 is rotatably placed in the sleeve 51. The input shaft 12 is fixed to one end of the torsion bar 13 by a locking pin not shown, and the worm shaft 43 is fixed to the other end of the torsion bar 13 by a locking pin 44.

The valve housing 42 is provided with a pump port 61, two cylinder ports, i.e., first and second cylinder ports 62 and 63, and a discharge port (not shown). The pump port 61, the first and second cylinder ports 62 and 63, and the discharge port open toward the rotor 52 through a plurality of oil passages provided in the sleeve 51 of the large diameter part 43b of the worm shaft 43. The first cylinder port 62 communicates with the first cylinder chamber CA through an oil passage 65 provided in the body 41, and the second cylinder port 63 communicates with the second cylinder chamber CB.

With the rotation of the input shaft 12, the rotor 52 rotates and the torsion bar 13 transmits the rotation to the worm shaft 43 while being twisted. The rotor 52 turns relative to the sleeve 51 all the more because the torsion bar 13 is twisted, so that communication of proper ports is attained.

Figure 3A:
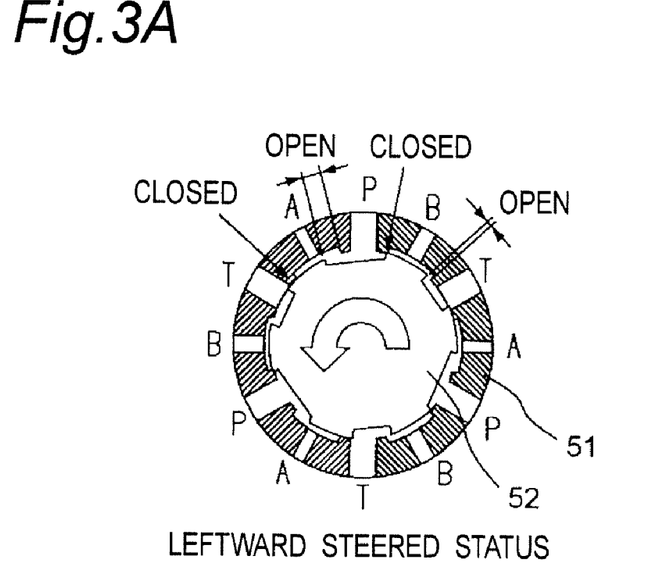
FIG. 3A is a schematic diagram for illustrating a leftward steering operation of the control valve of the power steering device.
Figure 3B:
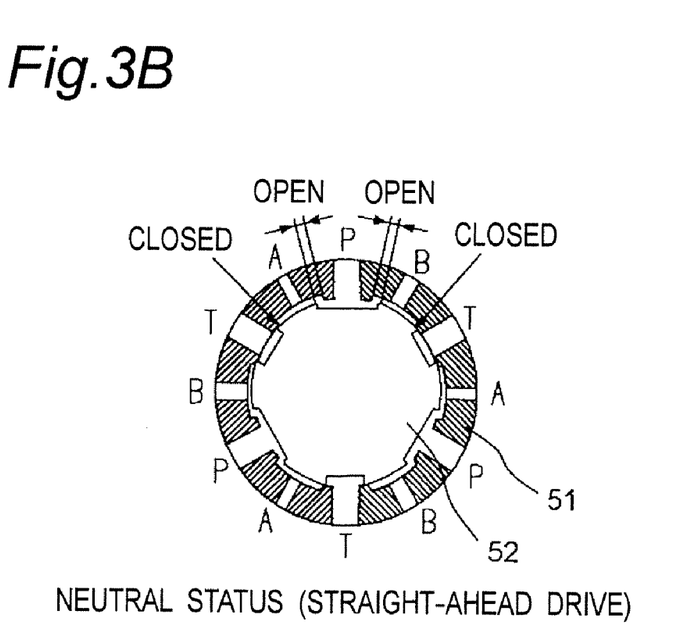
FIG. 3B is a schematic diagram for illustrating a steering operation in neutral status (straight-ahead drive) of the control valve of the power steering device.
Figure 3C:
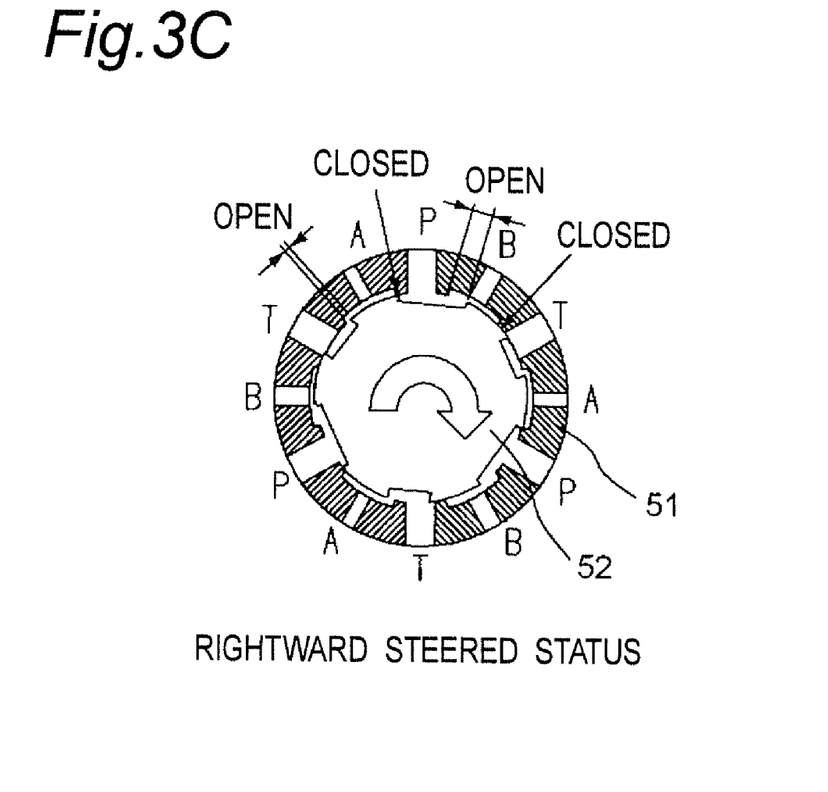
FIG. 3C is a schematic diagram for illustrating a rightward steering operation of the control valve of the power steering device.
Figure 3D:
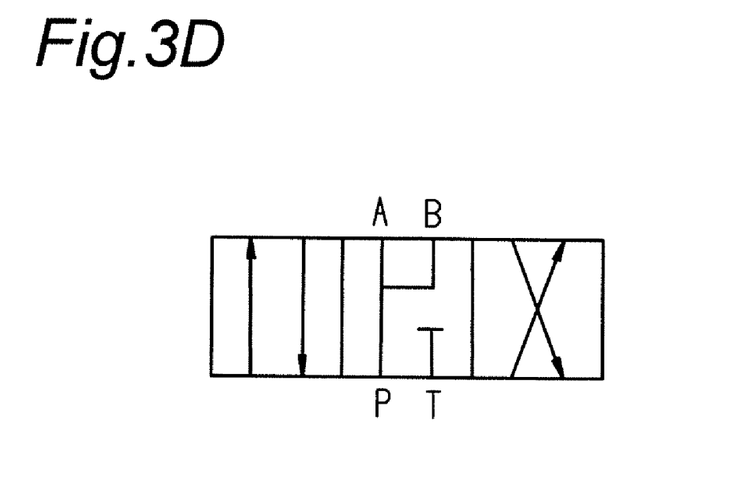
FIG. 3D is a schematic diagram for illustrating a sign of the control valve of the power steering device.

FIGS. 3A through 3D show schematic diagrams for illustrating operations of the control valve 5 of the power steering device. FIG. 3A shows the sleeve 51 and the rotor 52 in leftward steered status, FIG. 3B shows the sleeve 51 and the rotor 52 in neutral status (straight-ahead drive), FIG. 3C shows the sleeve 51 and the rotor 52 in rightward steered status, and FIG. 3D shows a sign of the control valve 5. In FIG. 3D, sign A denotes a first cylinder port, sign B denotes a second cylinder port, sign P denotes a pump port, and sign T denotes a discharge port.

In the leftward steered status, as shown in FIG. 3A, the rotor 52 turns counterclockwise relative to the sleeve 51 by a specified angle so as to attain communication between the first cylinder ports A and the pump ports P and communication between the second cylinder ports B and the discharge ports T.

In the neutral status, as shown in FIG. 3B, communication between the pump ports P and the first and second cylinder ports A and B is attained and the discharge ports T are isolated from the pump ports P and the first and second cylinder ports A and B.

In the rightward steered status, as shown in FIG. 3C, the rotor 52 turns clockwise relative to the sleeve 51 by a specified angle so as to attain communication between the first cylinder ports A and the discharge ports T and communication between the second cylinder ports B and the pump ports P.

In the power steering device in accordance with the embodiment, the oil-hydraulic pump 4 is driven at a low velocity by the electric motor 3, in non-steered status (neutral status), so that the oil-hydraulic pump 4 is driven just with maintenance of status in which the first and second cylinder chambers CA, CB of the power cylinder 6 are filled with oil. Such an operation makes oil hardly flow in status in which the assist does not work, so as to reduce a quantity of wasteful oil flow, so that reduction in power consumption and energy saving can be achieved while heat generation from the electric motor 3 is reduced.

On this occasion, the inverter 2 is controlled so that a pressure detected by the oil pressure sensor 10 reaches a target pressure $P_S$, and the oil-hydraulic pump 4 is thus driven by the electric motor 3. The target pressure PS is set while relations below are maintained, in consideration of pressure drop in the control valve 5 and the like.

$$P_S > P_A$$

$$P_S > P_B$$

The target pressure may be determined according to a pressure receiving area of the piston 26 and a configuration of a link mechanism ranging from the power cylinder 6 to the tires 30 on basis of a pressure required in quick steering, a pressure required in stationary steering, or the like.

Figure 4:
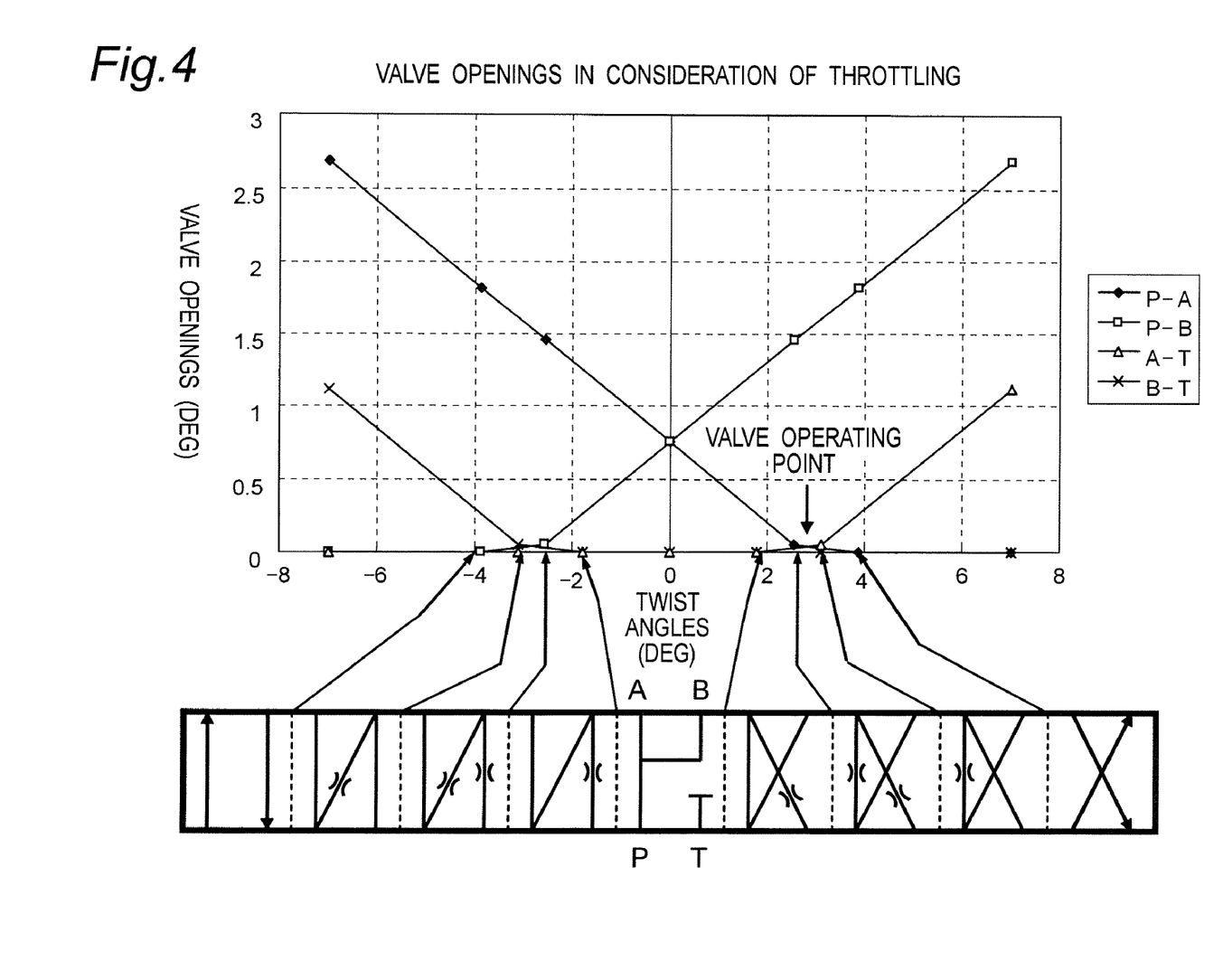
FIG. 4 is a diagram showing relations of valve openings to twist angles in consideration of throttling of the control valve of the power steering device.

FIG. 4 shows relations of valve openings to twist angles in consideration of throttling of the control valve of the power steering device. In FIG. 4, a horizontal axis represents twist angles (deg) and a vertical axis represents valve openings (deg). In lower part of FIG. 4 are shown position symbol signs of the control valve 5 in consideration of throttling. Herein, the valve openings represent angles corresponding to areas of opening between ports communicating with each other.

As shown in FIG. 4, leftward steering increases an absolute value of a negative value of the twist angle, and leads to shift to positions on left of the position symbol signs of the control valve 5, and rightward steering increases an absolute value of a positive value of the twist angle, and leads to shift to positions on right of the position symbol signs of the control valve 5.

Figure 5:
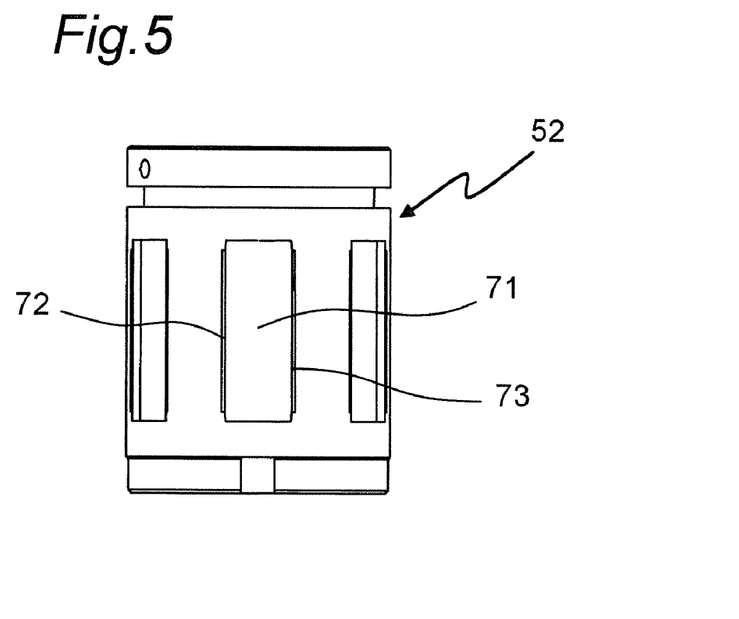
FIG. 5 is a side view of a rotor.

FIG. 5 shows a side view of the rotor 52, on which a plurality of grooves 71 are provided at specified circumferential intervals as shown in FIG. 5. Along both edges of the grooves 71 are provided step parts 72, 73. By the step parts 72, 73, an area of opening between the pump ports P and the first cylinder ports A (or the second cylinder ports B) is gradually changed. When the rotor 52 of a rotary valve rotates with steering, the step parts 72, on both the edges of the grooves 71 prevent sudden supply of the oil from the oil-hydraulic pump to the first cylinder ports A (or the second cylinder ports B) and smooth a change in the oil pressure. This prevents occurrence of a feeling of wrongness (shock) in steering, abnormal noises that might be caused by surges in the oil pressure, and/or the like.

Figure 6:
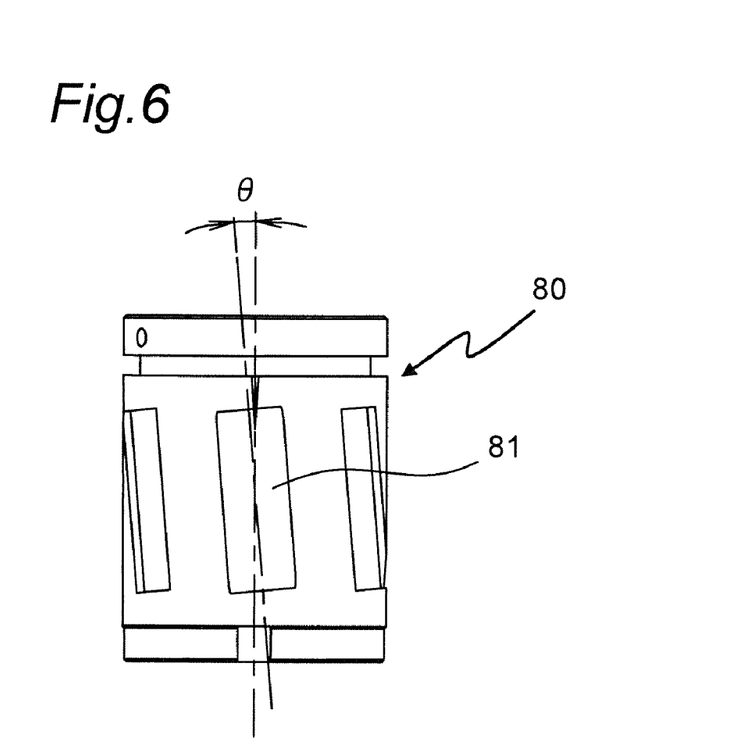
FIG. 6 is a side view of a rotor in accordance with another embodiment.

FIG. 6 shows a side view of a rotor in accordance with another embodiment. As shown in FIG. 6, grooves 81 of the rotor 80 are inclined with respect to a direction of a generatrix along a plane tangent to an outer circumferential surface thereof. This makes it possible to gradually change areas of opening between the pump ports P and the first, second cylinder ports A, B without machining on the plane. An angle θ that the grooves of the rotor 80 form with the direction of the generatrix is appropriately set according to a configuration of the valve and/or the like.

In the power steering device having the above configuration, the small-sized and low-cost power steering device can be attained while a certain response is maintained by retention of status in which the first, second cylinder chambers CA, CB of the power cylinder 6 are filled with oil, with use of the simple configuration.

Besides, the response in transition of the control valve 5 from the neutral status to a steering operation can be maintained with low power consumption, provided that the electric motor 3 is run at a lower velocity in the neutral status of the control valve 5 than in the steering operation by control of the inverter 2 by the vehicle ECU 1 so that the status in which the first, second cylinder chambers of the power cylinder 6 are filled with oil is maintained. Herein, a number of revolutions of the oil-hydraulic pump 4 driven by the electric motor 3 is in a range from 2000 to 4000 rpm in the steering operation and is 400 rpm in the neutral status.

The use of the rotary valve as the control valve 5 makes it possible to use rotation of the steering wheel in a steering operation, as it is, for a switching operation of the control valve 5, eliminates necessity of conversion from the rotating motion to a straight motion, further simplifies the configuration, and results in size reduction.

By the provision of the grooves 81, inclined with respect to the direction of the generatrix along the plane tangent to the outer circumferential surface of the rotor 80, on the outer circumference of the rotor 80 that is rotatably fitted in the sleeve of the rotary valve, as shown in FIG. 6, when communication between specified ports out of the plurality of ports provided on the sleeve is established through the grooves 81 with rotation of the rotor 80, the rotation of the rotor 80 causes gradual increase in areas of opening between the grooves 81 and the ports facing the grooves 81, and smoothes the change in the oil pressure in the switching of the rotary valve, so that occurrence of a feeling of wrongness in an operation of the steering wheel that might be caused by a sudden change in the oil pressure is prevented.

The formation of the inclined grooves 81 on the outer circumference of the rotor 80 eliminates necessity of machining of the step parts 72, 73 along both the edges of the grooves 71 shown in FIG. 5 and thus leads to reduction in manufacturing cost.

The gear pump that attains high self-priming ability from low-speed rotation is used as the oil-hydraulic pump 4, and thus the oil can be supplied with extremely low number of revolutions in order to maintain the status in which the first and second cylinder chambers of the power cylinder 6 are filled with the oil when the control valve 5 is in the neutral status, so that power consumption can be reduced. In addition, the gear pump, having a simple configuration in comparison with vane pumps, is inexpensive for the same performance and is capable of performing a low-velocity operation such that the first and second cylinder chambers of the power cylinder 6 are just replenished with oil. A vane pump that is similarly operated at low velocity cannot sufficiently suck oil and cannot supply a specified quantity of oil because an insufficient centrifugal force causes insufficient spread of vanes.

The drive signals of the inverter 2 are controlled by the vehicle ECU 1 that is a control unit, on basis of an oil pressure detected by the oil pressure sensor 10, and thus oil having a pressure required for a steering assist force can be supplied from the oil-hydraulic pump 4 to the power cylinder 6. Specifically, the vehicle ECU 1 performs feedback control in which a frequency of a drive signal of the inverter 2 is controlled so that an oil pressure detected by the oil pressure sensor 10 reaches a target pressure $P_S$.

The vehicle ECU 1 controls the frequency of the drive signal outputted from the inverter 2 so as to adjust the oil pressure detected by the oil pressure sensor 10 to a target value corresponding to at least one of signals representing a speed of the vehicle and a signal representing a steering angle, and is thereby capable of producing a steering assist force optimal for the speed of the vehicle, the steering angle and/or the like and improving steering ability.

On condition that specified time has elapsed while the speed of the vehicle is not less than a given value and while the steering angle is not more than a given value, for instance, the target pressure $P_S$ is shifted to lower pressure side on basis of determination of straight-ahead driving, and thus response to steering is blunted, when the steering angle is in vicinity of zero, so that an inclination angle of the tires 30 with respect to the steering angle can be made smaller than the inclination angle in normal operation. Thus stability required for high-speed straight-ahead driving can be attained.

On condition that the speed of the vehicle is not more than a given value and that the steering angle is not less than a given value, the target pressure $P_S$ is shifted to higher pressure side on basis of determination of garage entrance, stationary steering or the like, and thus response to small steering angles is improved, so that a required steering assist force can be supplied with satisfactory response.

Though the power steering device having the rotary valve used as the control valve 5 has been described in the above embodiment, the control valve is not limited thereto and the invention may be applied to a power steering device having a control valve with another configuration.

Though the configuration in which the pressure detected by the oil pressure sensor 10 is inputted into the vehicle ECU 1 and in which the vehicle ECU 1 controls the drive signals of the inverter 2 has been illustrated in the embodiment, the electric motor 3 can be controlled and operated by direct input of the pressure, detected by the oil pressure sensor 10, into the inverter 2.

In the power steering device in accordance with the embodiment, which has the number of revolutions of the electric motor 3 being extremely small in the neutral status of the control valve 5, assuming the target pressure $P_S$ of 1 MPa, a displacement q=5 cm$^3$/rev of the oil-hydraulic pump 4, and a rotation velocity N=400/min of the electric motor 3 (discharge flow rate of 2 liters/min), results in power consumption of 0.03 kW and thus electric power required for driving the motor is extremely low.

In comparison with conventional power steering devices in which a motor is driven only when required, the power steering device of the invention has a merit in that the simplification of the configuration results in reduction in size and weight and prevents deterioration in fuel efficiency which might be caused by increase in weight, and its demerit of power consumption increase that is caused by low-speed drive of the motor in the neutral status of the control valve is minute, in comparison with a synergistic effect of such reduction in size, weight and cost, and causes no problem.

In the embodiment, either the steered status or the neutral status is determined by the strain sensor on basis of strain in the torsion bar 13 or by the rudder angle sensor, and the electric motor 3 is run at a lower velocity in the neutral status than in the steering operation by control over the inverter 2 by the vehicle ECU 1; however, the number of revolutions of the electric motor may be controlled by control over the inverter, regardless of the steered status or the neutral status, so that there are specified pressures in the first and second cylinder chambers and/or the like of the power cylinder.

What is claimed is:

1. A power steering device comprising:
an oil-hydraulic pump,
an electric motor arranged and configured to drive the oil-hydraulic pump,
an inverter arranged and configured to output a drive signal to the electric motor,
a control valve arranged and configured to switch passages for oil supplied from the oil-hydraulic pump,
a power cylinder arranged and configured to produce a steering assist force by a piston driven by oil supplied from the oil-hydraulic pump through the control valve, and
a control unit configured to control the drive signal of the inverter,
the control valve including a pump port supplied with oil from the oil-hydraulic pump, a first cylinder port connected to a first cylinder chamber on one side of the piston, a second cylinder port connected to a second cylinder chamber on the other side of the piston, and a discharge port,
communication between the first cylinder port and the pump port and communication between the second cylinder port and the discharge port being established in steered status in one direction, and communication between the first cylinder port and the discharge port and communication between the second cylinder port and the pump port being established in steered status in another direction,
communication among the pump port, the first cylinder port and the second cylinder port being established when the control valve is in neutral status, and
isolation of the discharge port from the pump port and the first and second cylinder ports being established when the control valve is in neutral status.

2. The power steering device as claimed in claim 1, wherein the control unit is further configured to control the inverter so as to run the electric motor at a lower velocity than in steering operations in order to maintain status in which the first and second cylinder chambers of the power cylinder are filled with oil when the control valve is in the neutral status.

3. The power steering device as claimed in claim 1, wherein the control valve is a rotary valve.

4. The power steering device as claimed in claim 3, wherein the rotary valve includes a sleeve and a cylindrical rotor that is rotatably fitted in the sleeve,
an outer circumference of the rotor has grooves arranged so that communication between specified ports of a plurality of ports provided on the sleeve is established according to rotation of the rotor, and
the grooves of the rotor are inclined with respect to a direction of a generatrix along a plane tangent to an outer circumferential surface of the rotor.

5. The power steering device as claimed in claim 1, wherein the oil-hydraulic pump is a gear pump.

6. The power steering device as claimed in claim 2, further comprising
an oil pressure sensor arranged and configured to detect a pressure of oil supplied from the oil-hydraulic pump to the control valve,
the control unit being further configured to control the drive signal of the inverter on basis of the pressure of the oil detected by the oil pressure sensor.

7. The power steering device as claimed in claim 6, wherein the control unit is further configured to control a frequency of the drive signal of the inverter so that the pressure of the oil detected by the oil pressure sensor reaches a target value corresponding to at least one of signals representing a speed of a vehicle and a signal representing a steering angle.

8. The power steering device as claimed in claim 2, wherein the control valve is a rotary valve.

9. The power steering device as claimed in claim 8, wherein the rotary valve includes a sleeve and a cylindrical rotor that is rotatably fitted in the sleeve,
an outer circumference of the rotor has grooves arranged so that communication between specified ports of a plurality of ports provided on the sleeve is established according to rotation of the rotor, and
the grooves of the rotor are inclined with respect to a direction of a generatrix along a plane tangent to an outer circumferential surface of the rotor.

10. The power steering device as claimed in claim 2, wherein the oil-hydraulic pump is a gear pump.

* * * * *